(12) United States Patent
Bae et al.

(10) Patent No.: US 10,308,996 B2
(45) Date of Patent: Jun. 4, 2019

(54) HOT STAMPING STEEL AND PRODUCING METHOD THEREOF

(71) Applicant: Hyundai Motor Company, Seoul (KR)

(72) Inventors: Moon Ki Bae, Gyeonggi-do (KR); Seung Hyun Hong, Seoul (KR); Sung Chul Cha, Seoul (KR)

(73) Assignee: Hyundai Motor Company, Seoul (KR)

( * ) Notice: Subject to any disclaimer, the term of this patent is extended or adjusted under 35 U.S.C. 154(b) by 693 days.

(21) Appl. No.: 14/935,881

(22) Filed: Nov. 9, 2015

(65) Prior Publication Data

US 2017/0029913 A1 Feb. 2, 2017

(30) Foreign Application Priority Data

Jul. 30, 2015 (KR) .......................... 10-2015-0107973

(51) Int. Cl.
*C21D 9/46* (2006.01)
*C21D 8/02* (2006.01)
(Continued)

(52) U.S. Cl.
CPC .............. *C21D 9/46* (2013.01); *B32B 15/013* (2013.01); *B32B 15/04* (2013.01); *B32B 15/043* (2013.01);
(Continued)

(58) Field of Classification Search
CPC .... C23C 2/26; C23C 2/06; C23C 2/28; C23C 2/04; C23C 2/285; C23C 2/40; C23C 28/02; C23C 28/021; C23C 28/023; C23C 28/025; C23C 28/3225; C23C 30/00; C23C 30/005; B32B 15/013; B32B 15/04; B32B 15/043; B32B 15/18; C22C 38/32; C22C 38/28; C22C 38/26; C22C 38/22; C22C 38/02; C22C 38/04; C22C 38/12; C22C 38/14; C22C 38/44; C22C 38/48; C22C 38/50; Y10T 428/12799; Y10T 428/12792; Y10T 428/12958; Y10T 428/12965; Y10T 428/12972; C21D 9/46; C21D 8/0278;
(Continued)

(56) References Cited

U.S. PATENT DOCUMENTS

2014/0212684 A1* 7/2014 Kawata .................... C23C 2/28
428/632

FOREIGN PATENT DOCUMENTS

JP 2013-122076 A 6/2013
JP 2013-123722 A 6/2013
(Continued)

*Primary Examiner* — Michael E. La Villa
(74) *Attorney, Agent, or Firm* — Mintz Levin Cohn Ferris Glovsky and Popeo, P.C.; Peter F. Corless

(57) ABSTRACT

Disclosed is a steel composition for hot stamping that comprises carbon (C) in an amount of about 0.22 to about 0.25 wt %, silicon (Si) in an amount of about 0.2 to about 0.3 wt %, manganese (Mn) in an amount of about 1.2 to about 1.4 wt %, titanium (Ti) in an amount of about 0.02 to about 0.05 wt %, chromium (Cr) in an amount of about 0.11 to about 0.2 wt %, boron (B) in an amount of about 0.005 to about 0.01 wt %, zinc (Zr) in an amount of about 0.005 to about 0.02 wt %, niobium (Nb) in an amount of about 0.01 to about 0.05 wt %, tungsten (W) in an amount of about 0.1 to about 0.5 wt %, iron (Fe) constituting the remaining balance of the steel composition, all the wt % based on the total amount of the steel composition.

9 Claims, 4 Drawing Sheets

(51) Int. Cl.

| | |
|---|---|
| *C22C 38/32* | (2006.01) |
| *C22C 38/22* | (2006.01) |
| *C22C 38/28* | (2006.01) |
| *C22C 38/26* | (2006.01) |
| *C22C 38/04* | (2006.01) |
| *C22C 38/02* | (2006.01) |
| *C23C 2/06* | (2006.01) |
| *C23C 2/28* | (2006.01) |
| *B32B 15/01* | (2006.01) |
| *C23C 2/04* | (2006.01) |
| *C23C 28/02* | (2006.01) |
| *C23C 28/00* | (2006.01) |
| *C23C 2/40* | (2006.01) |
| *C23C 30/00* | (2006.01) |
| *B32B 15/18* | (2006.01) |
| *C22C 38/50* | (2006.01) |
| *B32B 15/04* | (2006.01) |
| *C22C 38/12* | (2006.01) |
| *C22C 38/14* | (2006.01) |
| *C22C 38/48* | (2006.01) |
| *C22C 38/44* | (2006.01) |
| *C23C 2/26* | (2006.01) |

(52) U.S. Cl.
CPC ............ *B32B 15/18* (2013.01); *C21D 8/0205* (2013.01); *C21D 8/0221* (2013.01); *C21D 8/0273* (2013.01); *C21D 8/0278* (2013.01); *C22C 38/02* (2013.01); *C22C 38/04* (2013.01); *C22C 38/12* (2013.01); *C22C 38/14* (2013.01); *C22C 38/22* (2013.01); *C22C 38/26* (2013.01); *C22C 38/28* (2013.01); *C22C 38/32* (2013.01); *C22C 38/44* (2013.01); *C22C 38/48* (2013.01); *C22C 38/50* (2013.01); *C23C 2/04* (2013.01); *C23C 2/06* (2013.01); *C23C 2/26* (2013.01); *C23C 2/28* (2013.01); *C23C 2/285* (2013.01); *C23C 2/40* (2013.01); *C23C 28/02* (2013.01); *C23C 28/021* (2013.01); *C23C 28/023* (2013.01); *C23C 28/025* (2013.01); *C23C 28/3225* (2013.01); *C23C 30/00* (2013.01); *C23C 30/005* (2013.01); *Y10T 428/12792* (2015.01); *Y10T 428/12799* (2015.01); *Y10T 428/12958* (2015.01); *Y10T 428/12965* (2015.01); *Y10T 428/12972* (2015.01)

(58) Field of Classification Search
CPC ... C21D 8/0273; C21D 8/0221; C21D 8/0205
See application file for complete search history.

(56) References Cited

FOREIGN PATENT DOCUMENTS

| | | |
|---|---|---|
| JP | 2014-122398 A | 7/2014 |
| KR | 10-2011-0053474 A | 5/2011 |
| KR | 20130008639 A | 1/2013 |
| KR | 20140102310 A | 8/2014 |
| WO | 2012-128225 A1 | 9/2012 |

* cited by examiner

Related out

Zn plating layer

Protection mechanism of
Zn Plating layer on Basic material (Fe)

Al-Si plating layer

Reason of insufficient corrosion resistance
of Al-Si plating layer

HOT STAMPING STEEL AND PRODUCING METHOD THEREOF

CROSS-REFERENCE TO RELATED APPLICATION

This application claims the priority benefit of Korean Patent Application No. 10-2015-0107973, filed on Jul. 30, 2015 in the Korean Intellectual Property Office, the disclosure of which is incorporated herein by reference.

TECHNICAL FIELD

The present invention relates to a hot stamping steel and a method for producing the same. The hot stamping steel may be Zn-plated such that corrosion resistance thereof may be substantially improved.

BACKGROUND

An elongation of a steel material is generally reduced with an increase in strength. Recently, a hot stamping process in which a steel plate is austenitized by heating to a temperature of 900° C. or greater, followed by quenching for martensitic transformation has been applied in a variety of fields due to its advantages in both high strength and formability.

In such a hot stamping process, a steel plate is pressed and quenched simultaneously, using a special mold through which cooling water is circulated. Characterized by cooling parts fixed within the mold, the hot stamping process can precisely control dimensions of the parts, and does not cause a spring back phenomenon even after taking the plate out of the mold.

However, such hot stamping steel still has a corrosion problem. To solve the corrosion problem, the hot stamping steel is plated with Al—Si, which prevents the mother material from being directly exposed to a corrosive environment. However, as shown in FIG. 1, a Zn plating layer, even though damaged to expose the mother material, can still delay the corrosion of the mother material through active electron exchange with Fe of the mother material. In contrast, when the Al—Si plating layer is damaged, the exposed mother material may undergo rapid corrosion since Al and Si cannot exchange electrons with the mother material.

Accordingly, research has been conducted to overcome the insufficient corrosion resistance of the Al—Si-plated hot stamping steel plate. For example, it has been suggested that Zn may be applied to a hot stamping steel plate. Compared to conventional Al—Si-plated hot stamping, Zn-plated hot stamping has improved plating stability and can significantly improve corrosion resistance.

However, steel plates for use in vehicles have been plated with Zn whereas hot stamping steels are plated with Al—Si, because Zn is melted at the hot stamping process temperature of about 900° C. For example, at the hot stamping temperature of about 900° C., Zn may become unstable such that its practical application has been limited. Pure Zn melts at a temperature of 420° C. and vaporizes at a temperature of 907° C. while a Zn—Fe alloy has increased melting point with an increase in Fe content. The melting point of Fe—Zn changes with the composition thereof as shown in FIG. 2. Zn—Fe alloys produced in practical hot stamping process, however, may not have sufficiently high melting point because their Zn contents are generally of about 90 wt % or greater. Hence, only the components of Zn—Fe alloys cannot solve the problem of Zn melting. For Zn-plated hot stamping steel, the Zn of the plated layer is melted and then solidified during quenching in practical processes. In this procedure, numerous fine cracks are generated on the Zn surface due to the LME (Liquid Metal Embrittlement) phenomenon, significantly reducing corrosion resistance and plating stability.

Therefore, conventional methods may have difficulty in applying Zn plating to hot stamping. In particular, those techniques in the related art, in which a Zn layer is simply applied to hot stamping steel, may have problems such as generation of microcracks in the zinc plating layer, however, solutions to the problems have not been suggested.

The above information disclosed in this Background section is only for enhancement of understanding of the background of the invention and therefore it may contain information that does not form the prior art that is already known in this country to a person of ordinary skill in the art.

SUMMARY OF THE INVENTION

Accordingly, the present invention has been made keeping in mind the above problems occurring in the related arts. In preferred aspects, the present invention provides a hot stamping steel in which the generation of microcracks in a Zn plating layer may be prevented during a hot stamping process and which exhibits substantially improved corrosion resistance microcracks.

In one aspect of the present invention, provided is a steel composition that may comprise: carbon (C) in an amount of about 0.22 to about 0.25 wt %, silicon (Si) in an amount of about 0.2 to about 0.3 wt %, manganese (Mn) in an amount of about 1.2 to about 1.4 wt %, titanium (Ti) in an amount of about 0.02 to about 0.05 wt %, chromium (Cr) in an amount of about 0.11 to about 0.2 wt %, boron (B) in an amount of about 0.005 to about 0.01 wt %, zirconium (Zr) in an amount of about 0.005 to about 0.02 wt %, niobium (Nb) in an amount of about 0.01 to about 0.05 wt %, tungsten (W) in an amount of about 0.1 to about 0.5 wt %, iron (Fe) constituting the remaining balance of the steel composition, all the wt % based on the total amount of the steel composition.

In addition, the present invention further provides the steel composition that may consist of, consist essentially of, or essentially consist of the components as described above. For example, the steel composition may consist of, consist essentially of, or essentially consist of: carbon (C) in an amount of about 0.22 to about 0.25 wt %, silicon (Si) in an amount of about 0.2 to about 0.3 wt %, manganese (Mn) in an amount of about 1.2 to about 1.4 wt %, titanium (Ti) in an amount of about 0.02 to about 0.05 wt %, chromium (Cr) in an amount of about 0.11 to about 0.2 wt %, boron (B) in an amount of about 0.005 to about 0.01 wt %, zirconium (Zr) in an amount of about 0.005 to about 0.02 wt %, niobium (Nb) in an amount of about 0.01 to about 0.05 wt %, tungsten (W) in an amount of about 0.1 to about 0.5 wt %, iron (Fe) constituting the remaining balance of the steel composition, all the wt % based on the total amount of the steel composition.

Unless otherwise indicated, it would be understood that the wt % of the components in the steel composition are based on the total weight of the steel composition.

In one aspect of the present invention, provided is a hot stamping steel that may comprise: a parental metal comprising the steel composition as described herein; a Zn plating layer; a Zn—Fe alloy layer formed, by hot stamping, between the parental metal and the Zn plating layer.

Preferably, the hot stamping steel may have a tensile strength of about 1470 MPa or greater.

Preferably, the Zn—Fe alloy layer may have a Zn content of about 90% by weight or greater, based on the total weight of the Zn—Fe alloy layer.

In another aspect, provided is a method for manufacturing hot stamping steel. The method may comprise steps of: producing a steel plate comprising carbon (C) in an amount of about 0.22 to about 0.25 wt %, silicon (Si) in an amount of about 0.2 to about 0.3 wt %, manganese (Mn) in an amount of about 1.2 to about 1.4 wt %, titanium (Ti) in an amount of about 0.02 to about 0.05 wt %, chromium (Cr) in an amount of about 0.11 to about 0.2 wt %, boron (B) in an amount of about 0.005 to about 0.01 wt %, zirconium (Zr) in an amount of about 0.005 to about 0.02 wt %, niobium (Nb) in an amount of about 0.01 to about 0.05 wt %, tungsten (W) in an amount of about 0.1 to about 0.5 wt %, iron (Fe) constituting the remaining balance of the steel composition, all the wt % based on the total amount of the steel composition; plating the steel plate with Zn; austenitizing the steel plate; hot stamping the Zn-plated steel plate at a temperature of about 750 to 850° C.; and inducing martensitic transformation in the steel plate.

Preferably, the austenitizing step may be performed by heating the steel plate to a temperature of 900° C. or greater.

The method may further comprise steps of: cooling the heated steel plate at a cooling rate of about 600° C./min or greater to a temperature of about 750 to 850° C. between the austenitizing step and the hot stamping step.

Preferably, the martensitic transformation may be achieved by quenching the steel plate at a rate of about 3000° C./min.

Other aspects of the present invention are disclosed herein.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
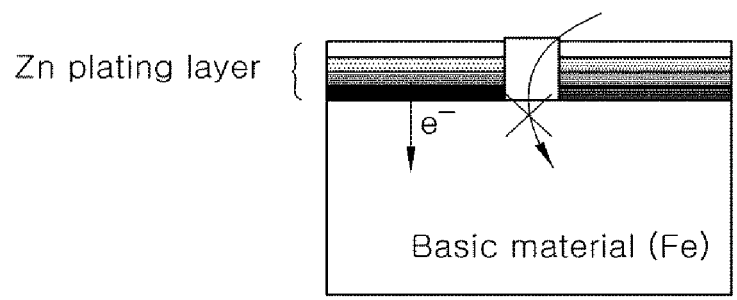
FIG. 1 illustrates corrosion generation in a Zn plating layer and an Al—Si plating layer upon cracking in the related arts.
Figure 1:
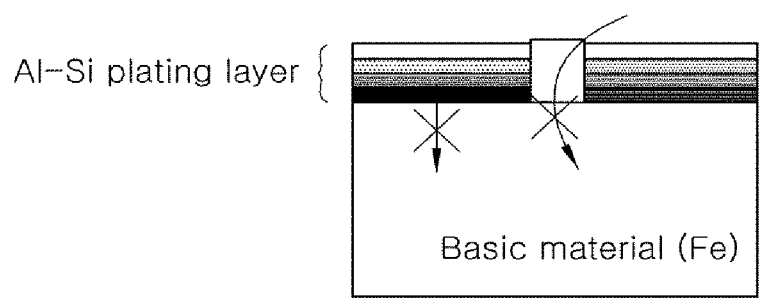
Figure 2:
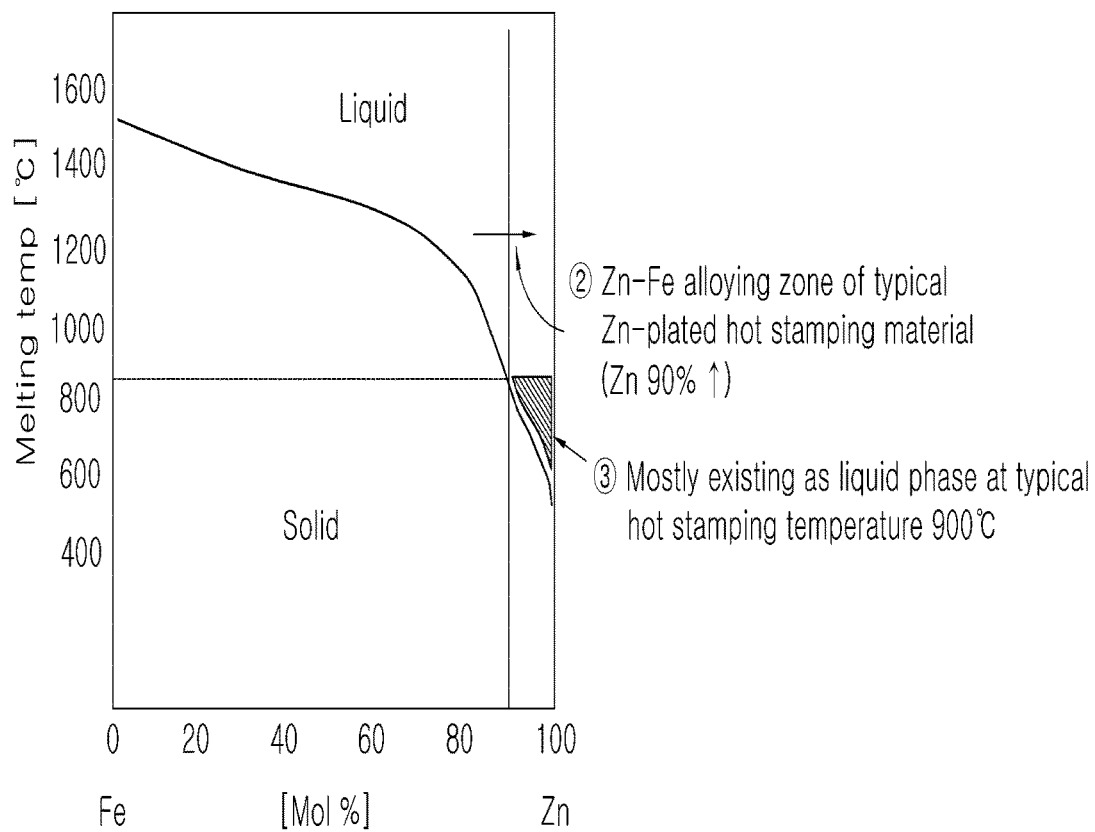
FIG. 2 is a graph in which the melting points of conventional Zn—Fe alloys are plotted as a function of the composition thereof.
Figure 3:
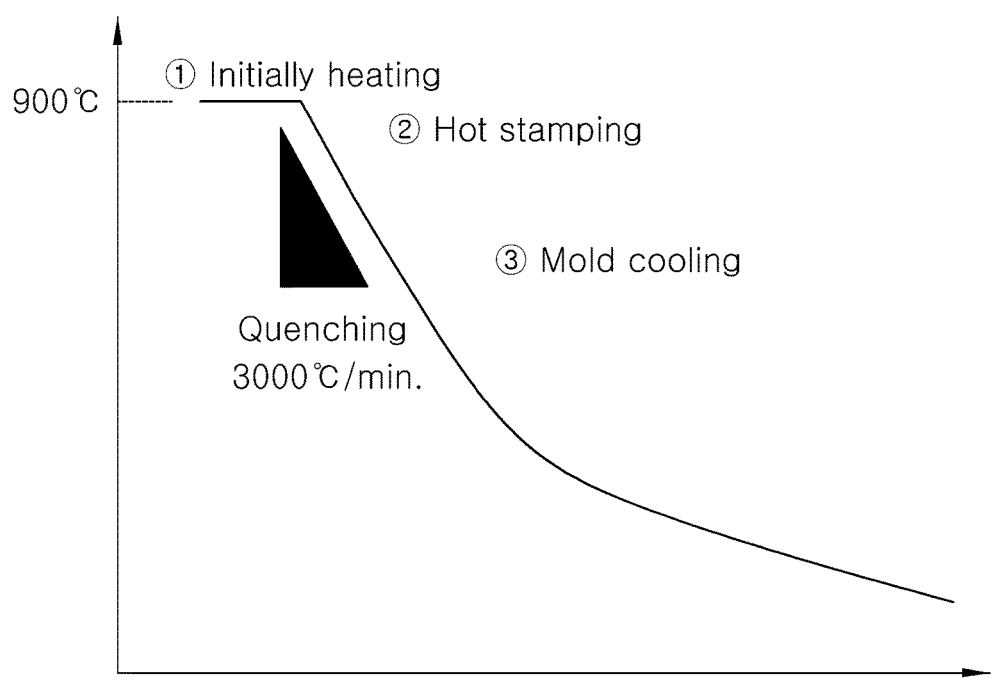
FIG. 3 is a graph illustrating processes of a conventional hot stamping process.
Figure 4:
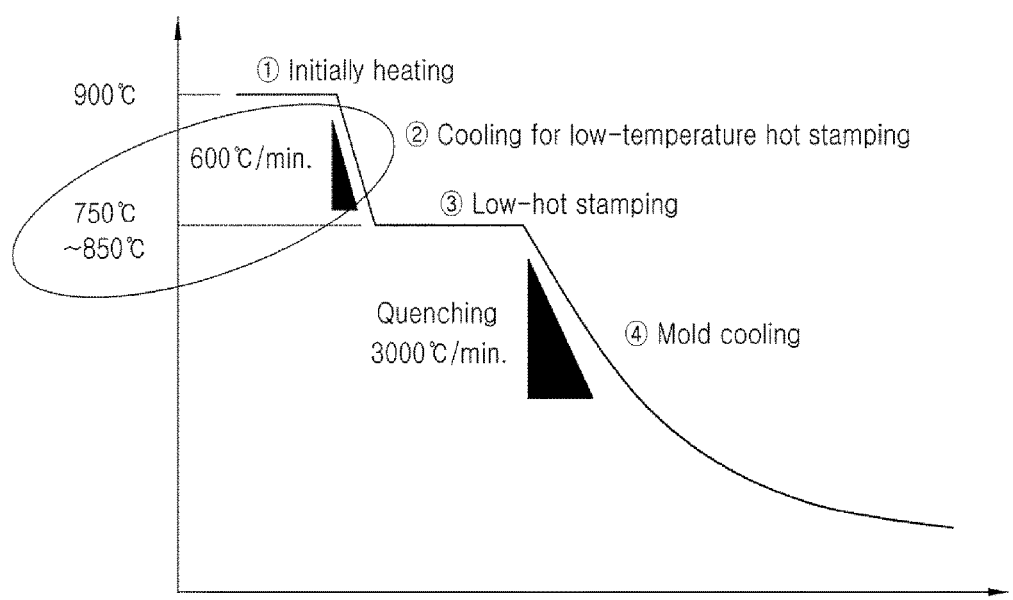
FIG. 4 is a graph illustrating an exemplary a hot stamping process according to an exemplary embodiment of the present invention.

The terminology used herein is for the purpose of describing particular embodiments only and is not intended to limit the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Unless otherwise defined, the meaning of all terms including technical and scientific terms used herein is the same as that commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Reference will now be made in greater detail to various exemplary embodiments of the present invention, an example of which is illustrated in the accompanying drawings. Wherever possible, the same reference numerals will be used throughout the drawings and the description to refer to the same or like parts.

In accordance with an aspect thereof, the present invention provides a steel composition which may be used for a parental metal. The steel composition may comprise: carbon (C) in an amount of about 0.22 to about 0.25 wt %, silicon (Si) in an amount of about 0.2 to about 0.3 wt %, manganese (Mn) in an amount of about 1.2 to about 1.4 wt %, titanium (Ti) in an amount of about 0.02 to about 0.05 wt %, chromium (Cr) in an amount of about 0.11 to about 0.2 wt %, boron (B) in an amount of about 0.005 to about 0.01 wt %, zirconium (Zr) in an amount of about 0.005 to about 0.02 wt %, niobium (Nb) in an amount of about 0.01 to about 0.05 wt %, tungsten (W) in an amount of about 0.1 to about 0.5 wt %, iron (Fe) constituting the remaining balance of the steel composition, all the wt % based on the total amount of the steel composition.

Further, the present invention provides a hot stamping steel. The hot stamping steel may comprise the parental metal comprising the steel composition as described above, a Zn plating layer coated on the parental metal, and a Zn—Fe alloy layer formed, by hot stamping, between the parental metal and the Zn plating layer.

The parental metal may be prepared using a typical steel manufacturing process. For example, the parental metal may be a steel plate manufactured by hot rolling, cold rolling, and various thermal treatments.

As referenced herein the term "parental metal" includes a base metal comprising the components of the composition as described above, and those components may be welded and processed from the molten components of metals to form a suitable metal substrate (e.g. steel sheet, block and the like). In particular, the parental metal may serve as a base substrate metal on which further treatment, e.g. plating, coating or austenitizing, can be performed to produce suitable hot stamping steels.

A Zn plating layer may be formed on the surface of the parental metal, and the Zn-plated parental metal may be subjected to hot stamping, such that the Zn—Fe alloy layer may be formed between the parental metal and the Zn plating layer.

The Zn plating layer, although susceptible to cracking, may serve as a sacrificial electrode to suppress the corrosion of the parental metal, thus guaranteeing high corrosion resistance of the parental metal.

After completion of the processes, the material metal may have a tensile strength of about 1470 MPa or greater. Particularly, the Zn—Fe alloy layer formed at the bottom of the Zn plating layer, that is, between the parental metal and the Zn plating layer, may have a Zn content of about 90% by weight, based on the total weight of the Zn—Fe alloy layer. Due to the composition of the parental metal composition, physical properties and effects of the hot stamping steel may be obtained, which will be further described later in a comparison manner in the following Examples and Comparative Examples.

Further, the present invention provides a method for manufacturing hot stamping steel. The method may comprise steps of: preparing a steel plate comprising carbon (C) in an amount of about 0.22 to about 0.25 wt %, silicon (Si) in an amount of about 0.2 to about 0.3 wt %, manganese (Mn) in an amount of about 1.2 to about 1.4 wt %, titanium (Ti) in an amount of about 0.02 to about 0.05 wt %, chromium (Cr) in an amount of about 0.11 to about 0.2 wt %, boron (B) in an amount of about 0.005 to about 0.01 wt %, zirconium (Zr) in an amount of about 0.005 to about 0.02 wt %, niobium (Nb) in an amount of about 0.01 to about 0.05 wt %, tungsten (W) in an amount of about 0.1 to about 0.5 wt %, iron (Fe) constituting the remaining balance of the steel composition, all the wt % based on the total amount of the steel composition, plating the steel plate with Zn, austenitizing the steel plate at a temperature of about 900° C. or greater, cooling the heated steel plate at a rate of about 600° C./min or greater to a temperature of about 750 to 850° C., hot stamping the steel plate at temperature of about 750 to 850° C., and quenching the steel plate at a rate 3000° C./min or greater to induce martensitic transformation.

Hereinbelow, the components in the steel composition according to the present invention will be described. Unless described otherwise, the wt % given in the following description is based on the total weight of the steel composition.

C (carbon), as used herein, may be added to provide the steel with strength, and further, may influence on the formation of the martensitic phase. When the carbon content is added in an amount less than about 0.22 wt %, the steel may be deteriorated in strength. When the carbon content is greater than about 0.25 wt %, hardness may be increased excessively thereby causing substantial brittleness.

Si (silicon), as used herein, may be added as a deoxidizer and may function to strengthen the solid solution and to increase carbon activity. When silicon is used in an amount of about 0.1 wt %, its deoxidizing effect may be negligible. On the other hand, when the silicon content is greater than about 0.3 wt %, hardenability (degree of easiness to form martensitic structures) may deteriorate.

Mn (manganese), as used herein, may be added to guarantee strength by improving hardenability. When Mn is used in an amount less than about 1.2 wt %, the strength may be reduced. When the Mn content is greater than about 1.4 wt %, grain boundary oxidation may occur, thus deteriorating physical properties.

Ti (titanium), as used herein, may be added to participate in forming carbon nitrides. Ti may increase the stability of the steel at high temperature and improve the steel in strength and toughness. The effect of Ti on strength and toughness may be negligible when it is used in an amount less than about 0.2 wt %. When the Ti content is greater than about 0.5 wt %, deposits coarse may be generated and low-temperature impact resistance may be reduced.

Cr (chromium), as used herein, may be added to improve the formation of carbide deposits and cementite and to increase high-temperature stability and hardenability. Cr may further harden the steel by microstructural refinement. At the Cr content less than about 0.11 wt %, only negligible improvement in hardenability may be obtained. When the Cr content is greater than about 0.20 wt %, grain boundary oxidation may be generated, thereby deteriorating the Zn plating layer, with the consequent deterioration of corrosion resistance and toughness.

B (boron), as used herein, may be added to improve hardenability and strength. The steel may have decreased strength at the B content less than about 0.005 wt % while microcracks are caused in the Zn plating layer at a B content greater than about 0.01 wt %. Particularly, when the B content is less than about 0.005 wt %, transformation from austenitic phase to ferritic phase may not be blocked sufficiently, which may further deteriorate hot stamping processability as well as the formation of martensite, thereby reducing the tensile strength.

Zr (zirconium), as used herein, may be added to form a deposit, remove N, O, and S, elements harmful to the physical properties, prolong the longevity of the steel, and reduce the size of non-metallic inclusions. At the Zr content less than about 0.005 wt %, the non-metallic inclusions may increase in size, thus increasing brittleness and decreasing tensile strength. When the Zr content is greater than about 0.02 wt %, $ZrO_2$ may be excessively formed, physical properties of the steel, may deteriorate, and may increase the production cost because Zr is an expensive element.

Nb (niobium), as used herein, may be added to greatly induce hardening through carbide formation, improve toughness through the microstructural refinement of grains, and increase recrystallization temperatures. When Nb is used in an amount less than about 0.01 wt %, its hardening effect may be negligible so that the tensile strength may not be improved. When the Nb content is greater than about 0.05 wt %, the recrystallization temperature may increase excessively to decrease hardenability, with the consequent deterioration of processability, productivity, and toughness.

W (tungsten), as used herein, may be added to increase wear resistance at high temperatures and toughness, and to prevent the excessive growth of martensitic structures. Only negligible improvement in tensile strength may be obtained at the W content less than about 0.1 wt %. When the W content is greater than about 0.5 wt %, excessive WC may be formed thereby deteriorating the toughness, and hardenability due to the consumption of carbon contained in the lattice.

The preparation of the parental steel plate may be a typical steel manufacturing process in the related arts without limitations to particular processes.

The plating step may be performed in the same manner as a zinc plating method generally used for steel plates used in automobiles. For example, a hot dip galvanizing method or other various plating methods may be used without limitations.

The austenitizing step may transform the steel structure from perlite and ferrite to austenite so as to increase the processability. For example, the steel plate may be heated to a temperature of about 900° C. or greater such that all the structures of steel may be transformed into an austenitic phase. Typically, carbon steel is transformed into austenite at a temperature of about 723 to 906° C. Accordingly, a temperature of about 900° C. or greater may be sufficient for the austenitic transformation of most steel structures.

In the cooling step, the steel plate heated to the temperature 900° C. or greater may be cooled at a rate of about 600° C./min or greater to a temperature of about 750 to 850° C. For example, air cooling or water cooling may be performed. Even after being cooled to the temperature, the structure of the steel may remain austenitic because of the presence of B, Zr, Nb, and W. For example, when B is used in the amount as described herein, the position of the nose in the TTT curve may be shifted in a clockwise direction. The use of B, Zr, Nb, and W in the amounts as describe herein may delay the time at which transformation from austenite to ferrite or pearlite starts, which makes it possible to conduct a hot stamping process at low temperatures. At a cooling rate less than about 600° C./min, sufficient processability may not be guaranteed because transformation from austenite to ferrite or pearlite starts. In addition, the austenite to be transformed into martensite may be deficient, resulting in a decrease in the tensile strength of the final product.

For the hot stamping, a temperature of about 750 to 850° C. may be employed according to the present invention, whereas conventional hot stamping is conducted at a temperature of about 900° C. Since the Zn plating layer is prevented from cracking at such a low temperature, the steel plate's high corrosion resistance may be ensured. At a hot stamping temperature is greater than about 850° C., the Zn plating layer may be cracked, thus deteriorating the corrosion resistance of the steel plate. When hot stamping is conducted at less than about 750° C., transformation from austenite to ferrite or pearlite may occur, thereby decreasing the tensile strength.

In the quenching step, the temperature of the steel plate may be rapidly decreased at a rate of about 3000° C./min down to room temperature to induce transformation of martensite from austenite. For example, a water cooling method may be used. Experimental data show that the quenching may not have a significant influence on the Zn plating layer.

EXAMPLE

The effects of the present invention will be explained in conjunction with Examples and Comparative Examples.

Data of stamping temperatures, cooling rates, and composition of parental steel and comparative steel are given in the following Table 1. The data in Table indicates that, when contents of B, Zr, Nb, and W are not in the ranges described, the tensile strength of the parental steel does not satisfy the necessary standard.

TABLE 1

| Ex. No | Stamping Temp. (° C.) | Cooling Rate (° C./min) | Content B | Cr | Zr | Nb | W | Tensile strength (MPa) | Remark |
|---|---|---|---|---|---|---|---|---|---|
| 1 | 750 | 650 | 0.006 | 0.15 | 0.019 | 0.015 | 0.3 | 1470 | |
| 2 | 800 | 650 | 0.006 | 0.15 | 0.019 | 0.015 | 0.3 | 1510 | |
| 3 | 850 | 650 | 0.006 | 0.15 | 0.019 | 0.015 | 0.3 | 1550 | |
| 4 | 750 | 650 | 0.01 | 0.15 | 0.005 | 0.015 | 0.5 | 1505 | |
| 5 | 800 | 650 | 0.01 | 0.15 | 0.005 | 0.015 | 0.5 | 1530 | |
| 6 | 850 | 650 | 0.01 | 0.15 | 0.005 | 0.015 | 0.5 | 1570 | |
| C. 1 | 750 | 650 | 0.002 | 0.15 | — | | | 1210 | Component B |
| C. 2 | 800 | 650 | 0.002 | 0.15 | — | | | 1190 | Comparative |
| C. 3 | 850 | 650 | 0.002 | 0.15 | — | | | 1305 | Examples |
| C. 4 | 750 | 610 | 0.011 | 0.15 | — | | | 1375 | |
| C. 5 | 800 | 650 | 0.015 | 0.15 | — | | | 1405 | |
| C. 6 | 850 | 630 | 0.013 | 0.15 | — | | | 1415 | |
| C. 7 | 750 | 650 | 0.010 | 0.15 | 0.001 | 0.01 | 0.42 | 1210 | Component Zr |
| C. 8 | 800 | 610 | 0.009 | 0.15 | 0.000 | 0.021 | 0.41 | 1270 | Comparative |
| C. 9 | 850 | 630 | 0.009 | 0.15 | 0.03 | 0.01 | 0.42 | 1310 | Examples |
| C. 10 | 800 | 630 | 0.009 | 0.010 | 0.017 | 0.000 | 0.42 | 1190 | Component Nb |
| C. 11 | 810 | 650 | 0.008 | 0.010 | 0.018 | 0.005 | 0.41 | 1290 | Comparative |
| C. 12 | 800 | 610 | 0.009 | 0.010 | 0.017 | 0.060 | 0.42 | 1350 | Examples |
| C. 13 | 810 | 630 | 0.008 | 0.010 | 0.018 | 0.055 | 0.41 | 1310 | |
| C. 14 | 800 | 630 | 0.010 | 0.010 | 0.017 | 0.01 | 0.05 | 1150 | Component W |
| C. 15 | 810 | 650 | 0.009 | 0.010 | 0.018 | 0.02 | 0.08 | 1185 | Comparative |
| C. 16 | 800 | 610 | 0.010 | 0.010 | 0.017 | 0.01 | 0.52 | 1350 | Examples |
| C. 17 | 810 | 630 | 0.009 | 0.010 | 0.018 | 0.02 | 0.60 | 1285 | |

Physical properties according to hot stamping temperatures are given in the following Table 2. The steel plates were observed to have poor tensile strength at a hot stamping temperature less than about 750° C., and microcracks appeared at a hot stamping temperature greater than about 850° C.

TABLE 2

| Ex. No | Stamping Temp. (° C.) | Content B | Cr | Zr | Nb | W | Tensile strength (MPa) | Depth of microcrack (μm) | No. of Microcrack (EA/cm$^2$) | Corrosion Test (corrosion free time) |
|---|---|---|---|---|---|---|---|---|---|---|
| 1 | 750 | 0.006 | 0.006 | 0.015 | 0.03 | 0.4 | 1470 | None | None | ≥40 days |
| 2 | 800 | 0.006 | 0.006 | 0.013 | 0.03 | 0.1 | 1470 | None | None | ≥40 days |
| 3 | 850 | 0.005 | 0.005 | 0.010 | 0.04 | 0.25 | 1485 | None | None | ≥40 days |
| 4 | 750 | 0.009 | 0.009 | 0.015 | 0.025 | 0.13 | 1490 | None | None | ≥40 days |
| 5 | 800 | 0.010 | 0.010 | 0.018 | 0.01 | 0.05 | 1510 | None | None | ≥40 days |
| C. 1 | 700 | 0.011 | 0.010 | 0.017 | 0.01 | 0.44 | 1210 | None | None | ≥40 days |
| C. 2 | 680 | 0.005 | 0.010 | 0.016 | 0.02 | 0.11 | 1190 | None | None | ≥40 days |
| C. 3 | 900 | 0.006 | 0.010 | 0.015 | 0.045 | 0.40 | 1505 | 95 | ≥30 | 23 days |
| C. 4 | 930 | 0.010 | 0.010 | 0.01 | 0.01 | 0.30 | 1510 | 103 | ≥30 | 20 days |

In Table 3, physical results of the steel plates of Comparative Examples in which the cooling rate was below the standard (600° C./min) after the austenitizing step are given. The steel plates of Comparative Examples were observed to have low tensile strength, and low corrosion resistance due to the generation of microcracks.

TABLE 3

| Ex. No | Stamping Temp. (° C.) | Cooling Rate (° C./min) | Content B | Cr | Zr | Nb | W | Tensile strength (MPa) | Depth of Microcrack (µm) | No. of Microcrack (EA/cm$^2$) | Corrosion Test (corrosion free time) |
|---|---|---|---|---|---|---|---|---|---|---|---|
| 1 | 750 | 650 | 0.006 | 0.006 | 0.015 | 0.03 | 0.4 | 1470 | None | None | ≥40 days |
| 2 | 800 | 610 | 0.006 | 0.006 | 0.013 | 0.03 | 0.1 | 1470 | None | None | ≥40 days |
| 3 | 850 | 650 | 0.005 | 0.005 | 0.010 | 0.04 | 0.25 | 1485 | None | None | ≥40 days |
| 4 | 750 | 630 | 0.009 | 0.009 | 0.015 | 0.025 | 0.13 | 1490 | None | None | ≥40 days |
| 5 | 800 | 700 | 0.010 | 0.010 | 0.018 | 0.01 | 0.05 | 1510 | None | None | ≥40 days |
| C. 1 | 800 | 550 | 0.010 | 0.010 | 0.018 | 0.01 | 0.05 | 1380 | 9 | 9 | ≥40 days |
| C. 2 | 810 | 500 | 0.010 | 0.010 | 0.018 | 0.01 | 0.05 | 1280 | 15 | 16 | ≥40 days |
| C. 3 | 800 | 580 | 0.010 | 0.010 | 0.018 | 0.01 | 0.05 | 1190 | 7 | 10 | 23 days |
| C. 4 | 810 | 520 | 0.010 | 0.010 | 0.018 | 0.01 | 0.05 | 1230 | 13 | 20 | 20 days |

The Comparative Examples in which the B content was not in the standard range (0.005-0.010 wt %) are shown in Table 4. The steel plates exhibited inferior tensile strength at the B content less than about 0.005 wt %, and microcracks were generated and thus exhibited low corrosion resistance at a B content greater than about 0.010 wt %.

TABLE 4

| Ex. No | Stamping Temp. (° C.) | Content B | Cr | Zr | Nb | W | Tensile strength (MPa) | Depth of microcrack (µm) | No. of Microcrack (EA/cm$^2$) | Corrosion Test (corrosion free time) |
|---|---|---|---|---|---|---|---|---|---|---|
| 1 | 750 | 0.006 | 0.006 | 0.015 | 0.03 | 0.4 | 1470 | None | None | ≥40 days |
| 2 | 800 | 0.006 | 0.006 | 0.013 | 0.03 | 0.1 | 1470 | None | None | ≥40 days |
| 3 | 850 | 0.005 | 0.005 | 0.010 | 0.04 | 0.25 | 1485 | None | None | ≥40 days |
| 4 | 750 | 0.009 | 0.009 | 0.015 | 0.025 | 0.13 | 1490 | None | None | ≥40 days |
| 5 | 800 | 0.010 | 0.010 | 0.018 | 0.01 | 0.05 | 1510 | None | None | ≥40 days |
| C. 1 | 800 | 0.003 | 0.010 | 0.011 | 0.04 | 0.25 | 1250 | None | None | ≥40 days |
| C. 2 | 800 | 0.015 | 0.010 | 0.01 | 0.04 | 0.27 | 1310 | 30 | 7 | 25 days |

The Comparative Examples in which the Cr content was not in the standard range (0.11-0.2 wt %) are shown in Table 5. The steel plates exhibited inferior tensile strength at the Cr content less than about 0.11 wt %, and underwent the generation of microcracks and thus exhibited low corrosion resistance at a B content greater than about 0.2 wt %.

TABLE 5

| Ex. No | Stamping Temp. (° C.) | Content B | Cr | Zr | Nb | W | Tensile strength (MPa) | Depth of Microcrack (µm) | No. of Microcrack (EA/cm$^2$) | Corrosion Test (corrosion free time) |
|---|---|---|---|---|---|---|---|---|---|---|
| 1 | 750 | 0.006 | 0.11 | 0.015 | 0.03 | 0.4 | 1470 | None | None | ≥40 days |
| 2 | 800 | 0.006 | 0.15 | 0.013 | 0.03 | 0.1 | 1470 | None | None | ≥40 days |
| 3 | 850 | 0.005 | 0.15 | 0.010 | 0.04 | 0.25 | 1485 | None | None | ≥40 days |
| 4 | 750 | 0.009 | 0.19 | 0.015 | 0.025 | 0.13 | 1490 | None | None | ≥40 days |
| 5 | 800 | 0.010 | 0.17 | 0.018 | 0.01 | 0.05 | 1510 | None | None | ≥40 days |
| C. 1 | 850 | 0.010 | 0.05 | 0.017 | 0.00 | 0.45 | 1250 | None | None | ≥40 days |
| C. 2 | 850 | 0.010 | 0.21 | 0.017 | 0.00 | 0.45 | 1410 | 50 | 10 | 30 days |

The Comparative Examples in which the Zr content was not in the standard range (0.005-0.020 wt %) are shown in Table 6. The steel plates exhibited inferior tensile strength at the Zr content less than about 0.005 wt % or greater than about 0.020 wt %.

TABLE 6

| Ex. No | Stamping Temp. (° C.) | Content | | | | | Tensile strength (MPa) | Depth of microcrack (μm) | No. of Microcrack (EA/cm$^2$) | Corrosion Test (corrosion free time) |
|---|---|---|---|---|---|---|---|---|---|---|
| | | B | Cr | Zr | Nb | W | | | | |
| 1 | 750 | 0.006 | 0.006 | 0.015 | 0.03 | 0.4 | 1470 | None | None | ≥40 days |
| 2 | 800 | 0.006 | 0.006 | 0.013 | 0.03 | 0.1 | 1470 | None | None | ≥40 days |
| 3 | 850 | 0.005 | 0.005 | 0.010 | 0.04 | 0.25 | 1485 | None | None | ≥40 days |
| 4 | 750 | 0.009 | 0.009 | 0.015 | 0.025 | 0.13 | 1490 | None | None | ≥40 days |
| 5 | 800 | 0.010 | 0.010 | 0.018 | 0.01 | 0.05 | 1510 | None | None | ≥40 days |
| C. 1 | 800 | 0.010 | 0.010 | 0.001 | 0.01 | 0.42 | 1210 | None | None | ≥40 days |
| C. 2 | 810 | 0.009 | 0.010 | 0.000 | 0.021 | 0.41 | 1270 | None | None | ≥40 days |
| C. 3 | 800 | 0.010 | 0.010 | 0.03 | 0.01 | 0.42 | 1310 | None | None | ≥40 days |
| C. 4 | 810 | 0.009 | 0.010 | 0.025 | 0.02 | 0.41 | 1290 | None | None | ≥40 days |

The Comparative Examples in which the Nb content was not in the standard range (0.01-0.05 wt %) are shown in Table 7. The steel plates exhibited inferior tensile strength at the Nb content less than about 0.01 wt % or greater than about 0.05 wt %.

TABLE 7

| Ex. No | Stamping Temp. (° C.) | Content | | | | | Tensile strength (MPa) | Depth of microcrack (μm) | No. of Microcrack (EA/cm$^2$) | Corrosion Test (corrosion free time) |
|---|---|---|---|---|---|---|---|---|---|---|
| | | B | Cr | Zr | Nb | W | | | | |
| 1 | 750 | 0.006 | 0.006 | 0.015 | 0.03 | 0.4 | 1470 | None | None | ≥40 days |
| 2 | 800 | 0.006 | 0.006 | 0.013 | 0.03 | 0.1 | 1470 | None | None | ≥40 days |
| 3 | 850 | 0.005 | 0.005 | 0.010 | 0.04 | 0.25 | 1485 | None | None | ≥40 days |
| 4 | 750 | 0.009 | 0.009 | 0.015 | 0.025 | 0.13 | 1490 | None | None | ≥40 days |
| 5 | 800 | 0.010 | 0.010 | 0.018 | 0.01 | 0.05 | 1510 | None | None | ≥40 days |
| C. 1 | 800 | 0.009 | 0.010 | 0.017 | 0.000 | 0.42 | 1190 | None | None | ≥40 days |
| C. 2 | 810 | 0.008 | 0.010 | 0.018 | 0.005 | 0.41 | 1290 | None | None | ≥40 days |
| C. 3 | 800 | 0.009 | 0.010 | 0.017 | 0.060 | 0.42 | 1350 | None | None | ≥40 days |
| C. 4 | 810 | 0.008 | 0.010 | 0.018 | 0.055 | 0.41 | 1310 | None | None | ≥40 days |

The Comparative Examples in which the W content was not in the standard range (0.1-0.5 wt %) are shown in Table 8. The steel plates exhibited inferior tensile strength at the W content less than about 0.1 wt % or greater than about 0.5 wt %.

TABLE 8

| Ex. No | Stamping Temp. (° C.) | Content | | | | | Tensile strength (MPa) | Depth of microcrack (μm) | No. of Microcrack (EA/cm$^2$) | Corrosion Test (corrosion free time) |
|---|---|---|---|---|---|---|---|---|---|---|
| | | B | Cr | Zr | Nb | W | | | | |
| 1 | 750 | 0.006 | 0.006 | 0.015 | 0.03 | 0.4 | 1470 | None | None | ≥40 days |
| 2 | 800 | 0.006 | 0.006 | 0.013 | 0.03 | 0.1 | 1470 | None | None | ≥40 days |
| 3 | 850 | 0.005 | 0.005 | 0.010 | 0.04 | 0.25 | 1485 | None | None | ≥40 days |
| 4 | 750 | 0.009 | 0.009 | 0.015 | 0.025 | 0.13 | 1490 | None | None | ≥40 days |
| 5 | 800 | 0.010 | 0.010 | 0.018 | 0.01 | 0.05 | 1510 | None | None | ≥40 days |
| C. 1 | 800 | 0.010 | 0.010 | 0.017 | 0.01 | 0.05 | 1150 | None | None | ≥40 days |
| C. 2 | 810 | 0.009 | 0.010 | 0.018 | 0.08 | 0.41 | 1185 | None | None | ≥40 days |
| C. 3 | 800 | 0.010 | 0.010 | 0.017 | 0.52 | 0.42 | 1350 | None | None | ≥40 days |
| C. 4 | 810 | 0.009 | 0.010 | 0.018 | 0.60 | 0.41 | 1285 | None | None | ≥40 days |

As described above, the hot stamping steel and the manufacturing method thereof in accordance with the present invention provide the following effects.

First, substantial improvement may be obtained particularly in corrosion resistance because the corrosion may be prevented even though the plating layer undergoes microcracking.

Second, the hot stamping steel can be manufactured at low temperature ranges, thereby reducing the production cost.

Finally, process conditions may be improved, thereby improving the productivity.

Although the various exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. A steel composition for hot stamping, comprising:
carbon (C) in an amount of about 0.22 to about 0.25 wt %;
silicon (Si) in an amount of about 0.2 to about 0.3 wt %;
manganese (Mn) in an amount of about 1.2 to about 1.4 wt %;
titanium (Ti) in an amount of about 0.02 to about 0.05 wt %;

chromium (Cr) in an amount of about 0.11 to about 0.2 wt %;
boron (B) in an amount of about 0.005 to about 0.01 wt %;
zirconium (Zr) in an amount of about 0.005 to about 0.02 wt %;
niobium (Nb) in an amount of about 0.01 to about 0.05 wt %;
tungsten (W) in an amount of about 0.1 to about 0.5 wt %; and
iron (Fe) constituting the remaining balance of the steel composition,
wherein all the wt % based on the total amount of the steel composition.

2. The steel composition for hot stamping of claim 1, consisting essentially of:
carbon (C) in an amount of about 0.22 to about 0.25 wt %;
silicon (Si) in an amount of about 0.2 to about 0.3 wt %;
manganese (Mn) in an amount of about 1.2 to about 1.4 wt %;
titanium (Ti) in an amount of about 0.02 to about 0.05 wt %;
chromium (Cr) in an amount of about 0.11 to about 0.2 wt %;
boron (B) in an amount of about 0.005 to about 0.01 wt %;
zirconium (Zr) in an amount of about 0.005 to about 0.02 wt %;
niobium (Nb) in an amount of about 0.01 to about 0.05 wt %;
tungsten (W) in an amount of about 0.1 to about 0.5 wt %; and
iron (Fe) constituting the remaining balance of the steel composition,
wherein all the wt % based on the total amount of the steel composition.

3. A hot stamping steel, comprising:
a parental metal comprising a steel composition of claim 1;
a Zn plating layer coated on the parental metal; and
a Zn—Fe alloy layer formed, by hot stamping, between the parental metal and the Zn plating layer.

4. The hot stamping steel of claim 3, wherein the hot stamping steel has a tensile strength of about 1470 MPa or greater.

5. The hot stamping steel of claim 3, wherein the Zn—Fe alloy layer has a Zn content of about 90% by weight or greater, based on the total weight of the Zn—Fe alloy layer.

6. A method for manufacturing a hot stamping steel, comprising steps of:
producing a steel plate comprising carbon (C) in an amount of about 0.22 to about 0.25 wt %, silicon (Si) in an amount of about 0.2 to about 0.3 wt %, manganese (Mn) in an amount of about 1.2 to about 1.4 wt %, titanium (Ti) in an amount of about 0.02 to about 0.05 wt %, chromium (Cr) in an amount of about 0.11 to about 0.2 wt %, boron (B) in an amount of about 0.005 to about 0.01 wt %, zirconium (Zr) in an amount of about 0.005 to about 0.02 wt %, niobium (Nb) in an amount of about 0.01 to about 0.05 wt %, tungsten (W) in an amount of about 0.1 to about 0.5 wt %, iron (Fe) constituting the remaining balance of the steel composition, all the wt % based on the total amount of the steel composition;
plating the steel plate with zinc (Zn);
austenitizing the steel plate;
hot stamping the Zn-plated steel plate at a temperature of about 750 to 850° C.; and
inducing martensitic transformation in the steel plate.

7. The method of claim 6, wherein the austenitizing step is performed by heating the steel plate to a temperature of about 900° C. or greater.

8. The method of claim 7, further comprising steps of:
cooling the heated steel plate at a cooling rate of about 600° C./min or greater to a temperature of about 750 to 850° C. between the austenitizing step and the hot stamping step.

9. The method of claim 6, wherein the martensitic transformation is achieved by quenching the steel plate at a rate of about 3000° C./min.

* * * * *